United States Patent [19]

Heath et al.

[11] 4,017,389

[45] Apr. 12, 1977

[54] METHOD AND APPARATUS FOR CONTINUOUSLY SEPARATING EMULSIONS

[75] Inventors: James E. Heath; Webster M. Sawyer, both of Houston, Tex.

[73] Assignee: Shell Oil Company, Houston, Tex.

[22] Filed: June 6, 1975

[21] Appl. No.: 584,450

[52] U.S. Cl. ........... 210/23R; 210/40; 210/80; 252/361
[51] Int. Cl.² .............................................. B01D 17/04
[58] Field of Search ......... 210/20, 23, Dig. 5, 30A, 36, 210/40, 41, 62, 74, 80, 89, 409; 252/361

[56] References Cited

UNITED STATES PATENTS

| | | | |
|---|---|---|---|
| 3,405,059 | 10/1968 | Sprow | 210/40 |
| 3,574,329 | 4/1971 | Beavun | 210/80 |
| 2,122,310 | 6/1938 | Burt | 210/23 X |
| 2,789,696 | 4/1957 | Jahnig et al | 210/80 |
| 2,556,722 | 6/1951 | Hersberger | 210/23 |
| 3,179,603 | 4/1965 | Edwards et al | 210/23 X |
| 3,414,511 | 12/1968 | Hitzman | 210/40 |
| 3,574,098 | 4/1971 | Boorujy | 210/62 |
| 3,607,741 | 9/1971 | Sohnius | 210/36 |
| 3,788,984 | 1/1974 | Teng et al | 210/30 A |
| 3,869,408 | 3/1975 | Herce et al | 252/361 |

*Primary Examiner*—Frank A. Spear, Jr.
*Attorney, Agent or Firm*—Fredrik Marlowe

[57] ABSTRACT

A method and an apparatus for continuously separating a disperse phase and a continuous phase from a liquid-liquid emulsion. The emulsion, such as an oil-water emulsion, is flowed into a contacting zone in which the emulsion is agitated with a continuous phase wet, disperse phase coalescing fibrous material, such as pulp, and separated into a disperse phase and a continuous phase which are separately withdrawn. The fibrous material, which degenerates with use and becomes less efficient in effecting separation of the emulsion phases, is periodically regenerated by contact with a disperse phase solvent.

3 Claims, 1 Drawing Figure

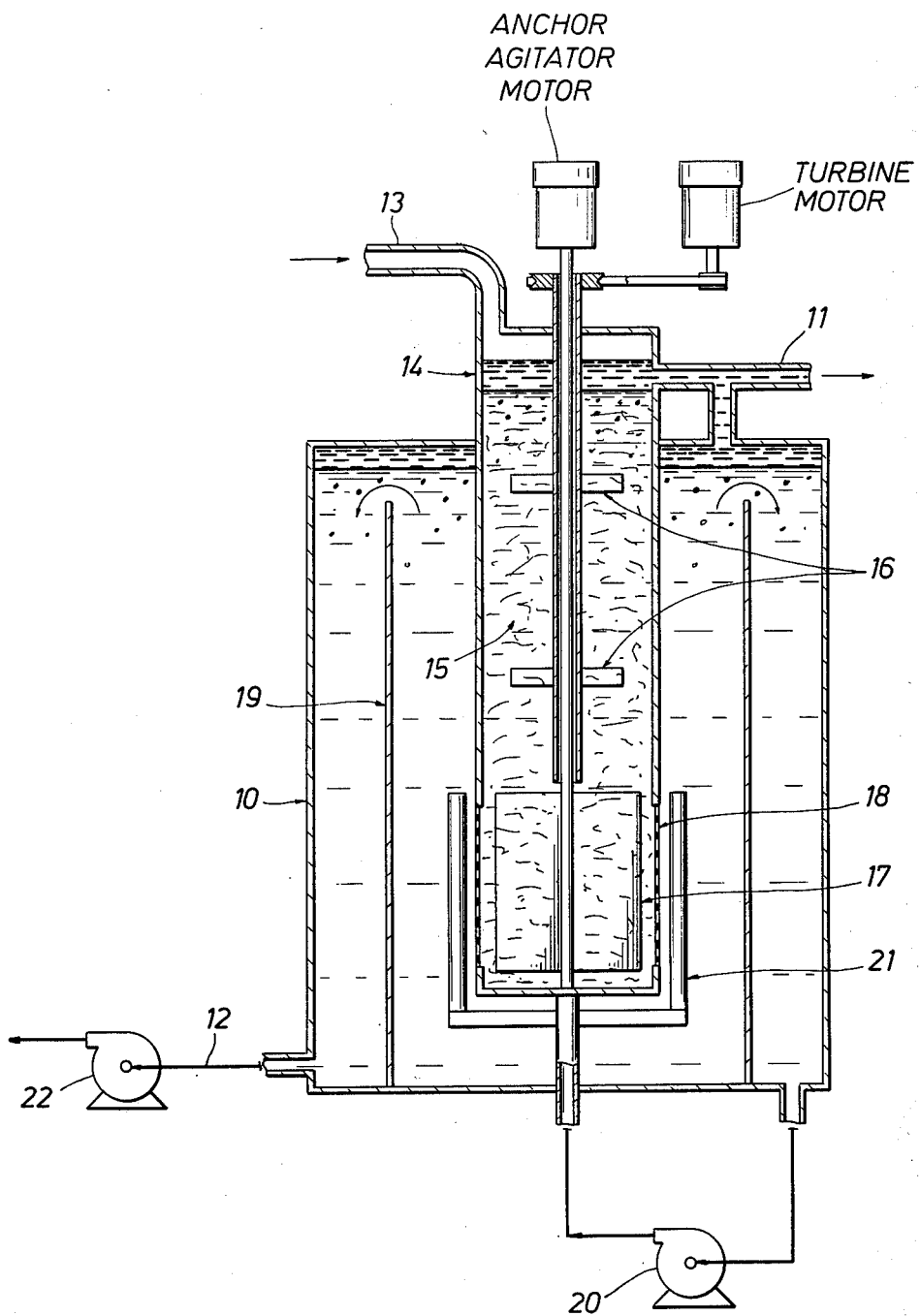

METHOD AND APPARATUS FOR CONTINUOUSLY SEPARATING EMULSIONS

REFERENCE TO RELATED APPLICATION

This invention is an improvement of the invention disclosed in Herce et al., Application Ser. No. 271,441, filed July 13, 1972, and now U.S. Pat. No. 3,869,408, the disclosure of which being herewith incorporated.

BACKGROUND OF THE INVENTION

Field of the Invention

This invention pertains to breaking emulsions and more particularly to a method and an apparatus for treating oil-in-water emulsions to separate oil and water therefrom.

Description of the Prior Art

The removal of oil from industrial waste waters is a problem of major current interest, particularly in the petroleum industry. Oil field produced waters, tanker ballast liquids, and refinery effluents are examples of liquids which may contain oil-water mixtures. The oil contained in such mixtures may be of significant value if separated and recovered. Additionally, and in some cases more importantly, if the oil is removed from the mixture, the water phase may be returned to natural streams, lakes, or oceans. This can save substantial and significant expenses required to dispose of oil-containing water by alternate means.

Examplary methods and apparatus employed to break oil-in-water emulsions are described in U.S. Pat. Nos. 1,887,774; 3,405,059; 3,152,196; 705,253; 3,147,216 and 3,580,844. None of these prior art inventions has been entirely effective to date in all applications.

SUMMARY OF THE INVENTION

The present invention relates to a method for separating the phases of a liquid-liquid emulsion having a continuous phase and a disperse phase by contacting the emulsion with a continuous phase wet, disperse phase coalescing or trapping fibrous solid suspended in a liquid, separately withdrawing continuous phase and disperse phase, and regenerating the fibrous solid by contact with a disperse phase solvent.

The present invention further encompasses an apparatus for continuously separating the phases of a liquid-liquid emulsion having a continuous phase and a disperse phase which includes a vessel, a suspension of continuous phase wet, disperse phase trapping fibrous solid in a chamber within the vessel; agitating means for agitating the suspension of fibrous solid in the chamber; means for admitting emulsion into the chamber; means for withdrawing a disperse phase from the top of the chamber; means for withdrawing a continuous phase from the chamber; and means for admitting a disperse phase solvent to the chamber to regenerate the fibrous solid.

The apparatus may include a fibrous filter at the bottom of the chamber within the vessel which coalesces the disperse phase drawn therethrough and into the vessel, whereby disperse phase floats to the top of the vessel for withdrawal along with disperse phase at the top of the chamber.

BRIEF DESCRIPTION OF THE DRAWINGS

A schematic diagram of the apparatus in cross section is shown.

DESCRIPTION OF A PREFERRED EMBODIMENT

Referring to the drawings, a contacting vessel 10 suitable for use in separating the phases of an emulsion according to the method of this invention is shown. The vessel is provided with an oil or disperse phase effluent outlet 11 near the top thereof and a clean brine, aqueous or continuous phase effluent outlet 12 near the bottom thereof. Oily brine or liquid-liquid emulsion effluent 13 is admitted to an internal contacting chamber 14 located within vessel 10. Chamber 14 is loaded with a suspension of a continuous phase wet, disperse phase trapping fibrous solid such as cellulose, e.g. pulp. The fibrous solid causes coalescing of the disperse phase of the liquid-liquid emulsion and much of the disperse phase, e.g. oil, floats to the top of this chamber. Turbine impellers 16 furnish continuous agitation of the liquid suspension in chamber 14. Further agitation is provided by anchor agitator 17 which is adjacent annular screen 18. As affluent 13 is added to chamber 14, liquid flow passes through annular screen 18 under the influence of suction from effluent pump 22 causing collection of some of fibrous material 15 on annular screen 18 in the form of a disperse phase coalescing filter. This is a second and final stage for breaking the emulsion and the resulting two phase mixture coming out of the filter flows into and upwardly in vessel 10 and over annular baffle 19. The disperse phase such as oil collects at the top of vessel 10 and is withdrawn along with disperse phase from the top of chamber 14. The continuous phase such as water or brine circulates to be withdrawn as effluent 12 under the influence of effluent pump 22. Backwash pump 20 operatively connecting with rotatable backwash arms 21 provides for periodic removal and/or washing and/or regeneration of collected fibers of fibrous material on annular screen 18. Means not shown herein but described in patent application Ser. No. 271,441, which disclosure is herewith incorporated, is provided for removing collected particulate solids such as sand from chamber 14. This apparatus is preferred for practice with the method of the invention but is susceptible to reasonable change within the scope of the invention.

With continuous use, the fibrous solid material above-described tends to become less efficient and more emulsion shows up in effluent 12. As this occurs, a disperse phase solvent is admitted to chamber 14 or elsewhere into contact with the fibrous material. The fibrous material may, of course, be removed partially or entirely from any or all of the apparatus disclosed for regeneration by solvent contact. The solvent may be admitted along with effluent 13 or elsewhere, for example through backwash 20 or through vessel 10 and then through backwash 20. The significant concept of the present invention is regeneration of the fibrous material by solvent contact and this may be achieved in many ways without exceeding the scope of the invention.

Admission of the solvent substantially regenerates the fibrous material and returns it to original efficiency. In the case where oil is the disperse phase, typical solvents which are suitable for use are hexane, diesel oil, toluene, isopropyl alcohol and mixtures thereof. Numerous other solvents are operative with the invention but the expense of the solvent and the ecological hazard it may present may restrict such use.

Having thus described the invention, the following example is presented as illustrative thereof:

Using the apparatus shown in the attached drawing, experiments were run to demonstrate the effect of solvent regeneration of pulp. In all cases, standard operating conditions consisted of 3 minutes residence time in the contacting chamber, 10 gpm./f.$^2$ flow rate through the annular filter, turbine and anchor agitator speeds of 80 and 60 r.p.m., respectively, 10% weight sodium chloride brine, influent brine oil content of 500 p.p.m., formation of influent dispersion by action of a centrifugal pump, and a pulp concentration of 2500 p.p.m. weight in the contacting chamber. The pump was a fully bleached southern hardwood which had been chemically pulped and subsequently length-classified such that the minimum fiber length was greater than 100 microns. With fresh pulp under the above conditions the apparatus operated for several days producing brine with oil content less than 10 p.p.m. weight. After several days continuous operation, the pressure drop across the annular filter rose to a point (greater than about 3 inches mercury) that significant amounts of uncoalesced oil came through the filter, and the effluent quality deteriorated. The process was then stopped and the pulp washed with hexane. After washing the process was resumed and effluent oil content had been reduced to 10 p.p.m. and remained there for several more days continuous operation. This process was repeated through several cycles of wash with the same results. Washing was successful both external (e.g. removing pulp from chamber to wash) and internal (e.g. lowering liquid level in chamber and adding solvent directly to chamber). Successful washes have also been achieved using diesel oil, toluene, and a fifty-fifty mixture of toluene and isopropyl alcohol.

I claim as my invention:

1. A method for continuous two-stage separation of the phases of a liquid-liquid emulsion having a disperse phase of 30 ppm to 5,000 ppm and a continuous phase comprising:
   providing a liquid suspension of 500 ppm to 20,000 ppm of continuous phase wet, disperse phase trapping fibers within a chamber located concentrically within a vessel;
   admitting liquid-liquid emulsion into the chamber;
   agitating the fibers and emulsion to break at least part of the emulsion in the chamber into a first disperse phase and a first continuous phase;
   allowing the first disperse phase to float to the top of the chamber and withdrawing the first disperse phase therefrom;
   discharging the first continuous phase and remaining emulsion from the chamber through a fiber filter on a fiber impermeable screen and into the vessel, thereby breaking the remaining emulsion into a second disperse phase and a second continuous phase;
   flowing the second disperse phase and second continuous phase to the top of the vessel, withdrawing the second disperse phase therefrom, flowing the second continuous phase over and down around an annular baffle, and withdrawing the second continuous phase from the vessel; and
   combining and discharging the first and second continuous phases from the vessel.

2. The method of claim 1, including periodically backwashing a disperse phase solvent from the vessel through the screen into the chamber to remove at least the excess fiber from the fiber filter on the screen and wash and regenerate the fiber remaining on the screen and in the chamber.

3. The method of claim 1, wherein excessive buildup of fiber on the screen is retarded by revolving an anchor agitator within the chamber and adjacent to the screen.

* * * * *